United States Patent
Attig et al.

(10) Patent No.: US 7,804,844 B1
(45) Date of Patent: Sep. 28, 2010

(54) DATAFLOW PIPELINE IMPLEMENTING ACTIONS FOR MANIPULATING PACKETS OF A COMMUNICATION PROTOCOL

(75) Inventors: Michael E. Attig, San Jose, CA (US); Gordon J. Brebner, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 198 days.

(21) Appl. No.: 12/186,078

(22) Filed: Aug. 5, 2008

(51) Int. Cl.
*H04L 12/43* (2006.01)

(52) U.S. Cl. ............... 370/458; 370/401; 370/465; 709/223; 712/201

(58) Field of Classification Search .......... 370/458, 370/401, 465–467, 469–474, 476; 709/223–226; 712/201
See application file for complete search history.

(56) References Cited

U.S. PATENT DOCUMENTS

2005/0021871 A1* 1/2005 Georgiou et al. ............ 709/250
2007/0220232 A1* 9/2007 Rhoades et al. ............. 712/20
2007/0237146 A1* 10/2007 Hadzic et al. ............... 370/392

OTHER PUBLICATIONS

U.S. Appl. No. 11/818,788, filed Jun. 14, 2007, Attig et al.
U.S. Appl. No. 11/818,811, filed Jun. 14, 2007, Attig et al.
U.S. Appl. No. 11/818,792, filed Jun. 14, 2007, Brebner.
U.S. Appl. No. 11/818,722, filed Jun. 14, 2007, Brebner et al.
Paulin, P.G. et al.; "Force-Directed Scheduling in Automatic Data Path Synthesis"; Proceedings of 24th ACM/IEEE Conference on Design Automation (DAC); Copyright 1987 ACM; pp. 195-202.
Soviani, Cristian et al.; "Synthesis of High-Performance Packet Processing Pipelines"; Proceedings of 43rd ACM/IEEE Conference on Design Automation; DAC 2006; Jul. 24-28, 2006; Copyright 2006 ACM; pp. 679-682.

(Continued)

*Primary Examiner*—Ricky Ngo
*Assistant Examiner*—Gary Mui
(74) *Attorney, Agent, or Firm*—LeRoy D. Maunu; Lois D. Cartier (57) ABSTRACT

A processor is specified for implementing actions for manipulating the fields of the packets of a communication protocol. A cluster specification is input specifying clusters of independent actions. A constraint specification is input of dependencies constraining performance of the actions, including a dependency between a first action from a first cluster and a second action from a second cluster. Each cluster is assigned to a stage of a dataflow pipeline of the processor, and the dependencies are satisfied by performing each stage in an order of the dataflow pipeline. The first action is transferred between the stages of the first and second clusters. A timeframe is scheduled for performing each action in each stage of the dataflow pipeline. The timeframe is scheduled for performing of the first and second actions in the stage of the second cluster in accordance with the dependencies. A specification of the dataflow pipeline is output.

20 Claims, 5 Drawing Sheets

OTHER PUBLICATIONS

Lee, Edward Ashford et al.; "Static Scheduling of Synchronous Data Flow Programs for Digital Signal Processing"; IEEE Trans. on Computers; Jan. 1987; Copyright 1987 IEEE; pp. 24-35.

Xilinx, Inc.; U.S. Appl. No. 12/186,057 by Attig et al.; filed Aug. 8, 2008.

Xilinx, Inc.; U.S. Appl. No. 12/186,099 by Attig et al.; filed Aug. 8, 2008.

Xilinx, Inc.; U.S. Appl. No. 12/186,428 by Attig et al.; filed Aug. 8, 2008.

* cited by examiner

DATAFLOW PIPELINE IMPLEMENTING ACTIONS FOR MANIPULATING PACKETS OF A COMMUNICATION PROTOCOL

FIELD OF THE INVENTION

The present invention generally relates to packet processors, and more particularly to processing the declarative description of a packet processor.

BACKGROUND

For packet-based communication protocols, packets communicate data and control information between devices via a communication network. Two communicating devices process the packets to transfer the data and control information between the devices. The communication network typically includes intermediate devices that transfer the packets between the two communicating devices, and the intermediate devices process the packets too.

It is difficult and time consuming to specify the packet processing performed by these devices. For example, it is difficult and time consuming to specify the required functionality of the packet processor together with timing characteristics such as throughput and latency. There is a general need to reduce the complexity of designing packet processors.

The present invention may address one or more of the above issues.

SUMMARY

Various embodiments of the invention provide a method for specifying a processor implementing actions for manipulating packets of a communication protocol. A cluster specification is input specifying clusters of the actions for manipulating the fields of the packets of the communication protocol. Each action of each cluster is not dependent on all other of the actions in the cluster. A constraint specification is input of one or more dependencies constraining performance of the actions. The dependencies include a dependency between a first action from a first cluster and a second action from a second cluster. Each cluster is assigned to a respective stage of a dataflow pipeline of the processor, and the dependencies are satisfied by performing the actions of each stage in an order of the stages in the dataflow pipeline. The first action is transferred from the respective stage of the first cluster to the respective stage of the second cluster. A timeframe is scheduled for performing each action in each stage of the dataflow pipeline. The timeframe is scheduled for performing of the first and second actions in the respective stage of the second cluster in accordance with the dependencies. A specification of the dataflow pipeline is output.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION OF THE DRAWINGS

Figure 1:
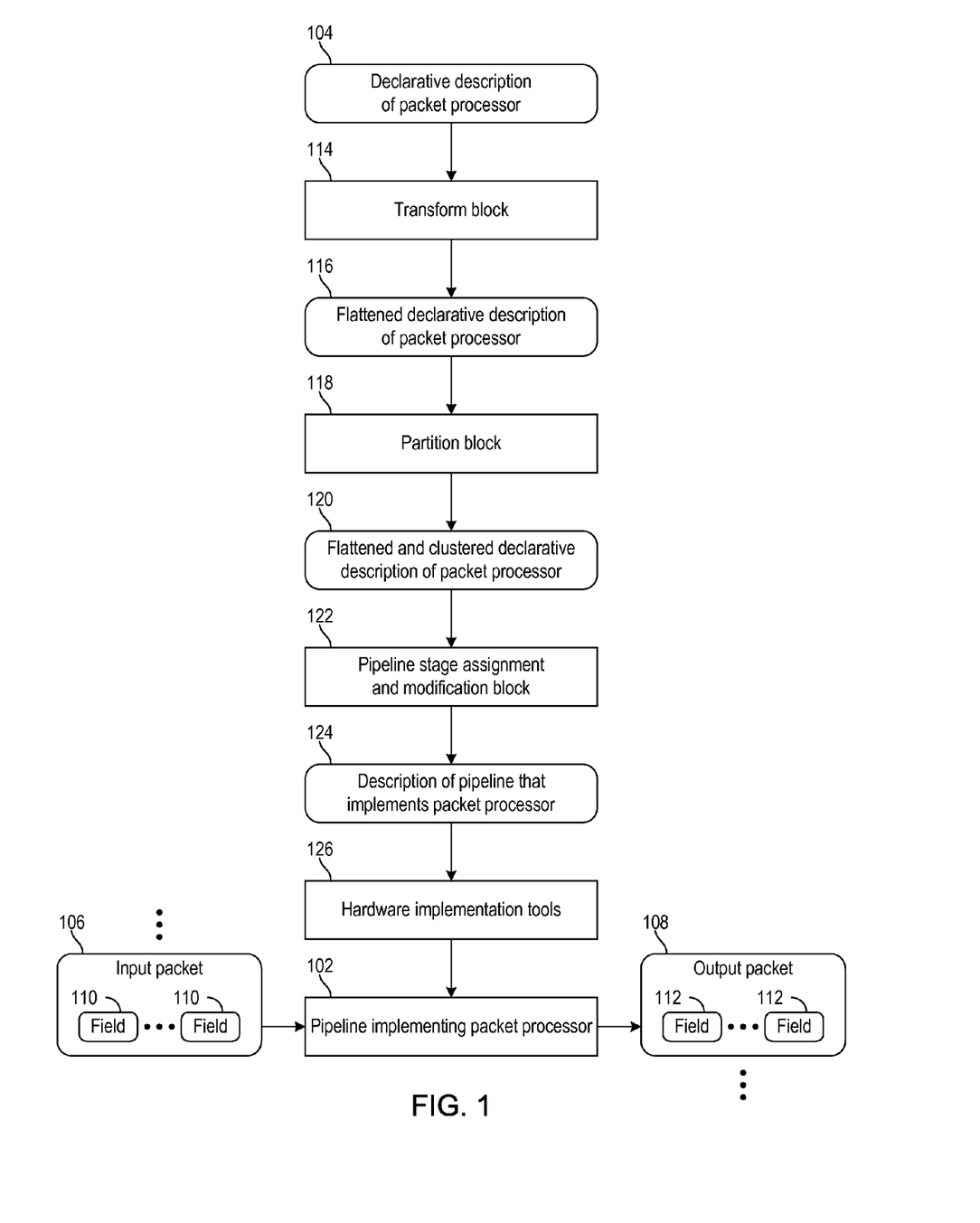
FIG. 1 is a dataflow diagram of a process for implementing and using a packet processor in accordance with various embodiments of the invention.

FIG. 1 is a dataflow diagram of a process for implementing and using a packet processor in accordance with various embodiments of the invention. The process generates a pipeline 102 for the packet processor from a declarative description 104 of the packet processor. The pipeline 102 receives input packets including input packet 106 and produces output packets including output packet 108. The pipeline 102 modifies input packet 106 to produce output packet 108 according to the declarative description 104, including modifying one or more of the fields 110 of the input packet 106 to produce the fields 112 of the output packet 108.

Transform block 114 flattens the rules of the declarative description 104 to produce the flattened declarative description 116 of the packet processor. The declarative description 104 includes sequences of rules for processing the input packets.

Each sequence of declarative description 104 is a sequence of one or more guarded rules. Each guarded rule in each sequence, except possibly a last guarded rule in each sequence, includes a guard condition and an action or another sequence that the guard condition enables and disables. The last guarded rule in each sequence optionally includes a guard condition and generally includes an action or another sequence that the optional guard condition enables and disables. For the first satisfied guard condition, if any, of the guarded rules within each sequence, the action or sequence of the guarded rule with this first satisfied guard condition is enabled, and the actions or sequences of the other guarded rules are disabled. If every guarded rule in a sequence has a guard condition and none of these guard conditions are satisfied, then every guarded rule in the sequence has a disabled action or sequence. If the last guarded rule in a sequence does not have a guard condition and none of the guard conditions of the other guarded rules in the sequence are satisfied, then the action or sequence of the last guarded rule is enabled, and the actions or sequences of the other guarded rules are disabled.

The flattened declarative description 116 includes guarded rules including an action and often including a guard condition for enabling and disabling the action, but the flattened declarative description 116 does not include any sequences of guarded rules. Alternatively, the flattened declarative description 116 is viewed to still include sequences, but each sequence is one guarded rule that is a last guarded rule including an action and an optional guard condition for enabling and disabling the action. Both the declarative description 104 and the flattened declarative description 116 are declarative descriptions of a same packet processor.

Example 1 below is an example of a declarative description of a sequence of two guarded rules and a last guarded rule without its optional guard condition. The guard conditions are included within square brackets and the actions are included within braces. The vertical bars indicate that the guarded rules are not separate guarded rules, but instead form a sequence of guarded rules. The sequence of guarded rules sets a field for the internet protocol address in a packet to an appropriate value based on a value of the version field of the packet.

Example 1:
    [ver=1]{ip=ip4}|[ver=2]{ip=ip6}|{ip=default}

Example 2 below shows the result of flattening Example 1 into three guarded rules according to various embodiments of the invention. Example 2 includes a corresponding guarded rule for each of the three actions within the sequence of Example 1.

Example 2:
    [ver=1]{ip=ip4}
    [!(ver=1)&&(ver=2)]{ip=ip6}
    [!(ver=1)&&!(ver=2)]{ip=default}

Partition block 118 separates the guarded rules of the flattened declarative description into clusters of independent guarded rules of the flattened and clustered declarative description 120 of the packet processor. Two guarded rules are dependent, for example, when one guarded rule defines data required by the other guarded rule. Guarded rules are independent, for example, when they have guard conditions that cannot be satisfied simultaneously. The three guarded rules in Example 2 are independent because their guard conditions are mutually exclusive. All of the guarded rules within each cluster are independent of each other, and any two or more mutually dependent guarded rules are in different clusters.

Stage assignment and modification block 122 orders the clusters of the flattened and clustered declarative description 120, and assigns each cluster to a stage of the pipeline 102 according to the order of the clusters. Block 122 also moves selected actions between stages to simplify the pipeline 102 in one embodiment. Block 122 generates a description 124 of a pipeline 102 that implements the packet processor. In one embodiment, the pipeline description 124 is an HDL description, such as a Verilog or VHDL description, of the pipeline 102.

Implementation tools 126 generate a hardware pipeline 102 implementing the packet processor specified by description 124. In one embodiment, implementation tools 126 generate configuration data for a programmable integrated circuit from an HDL description 124, and the programmable integrated circuit implements the hardware pipeline 102 after loading the configuration data. In another embodiment, implementation tools 126 are ASIC design tools that translate an HDL description 124 into a hardware pipeline 102 within an integrated circuit.

Figure 2:
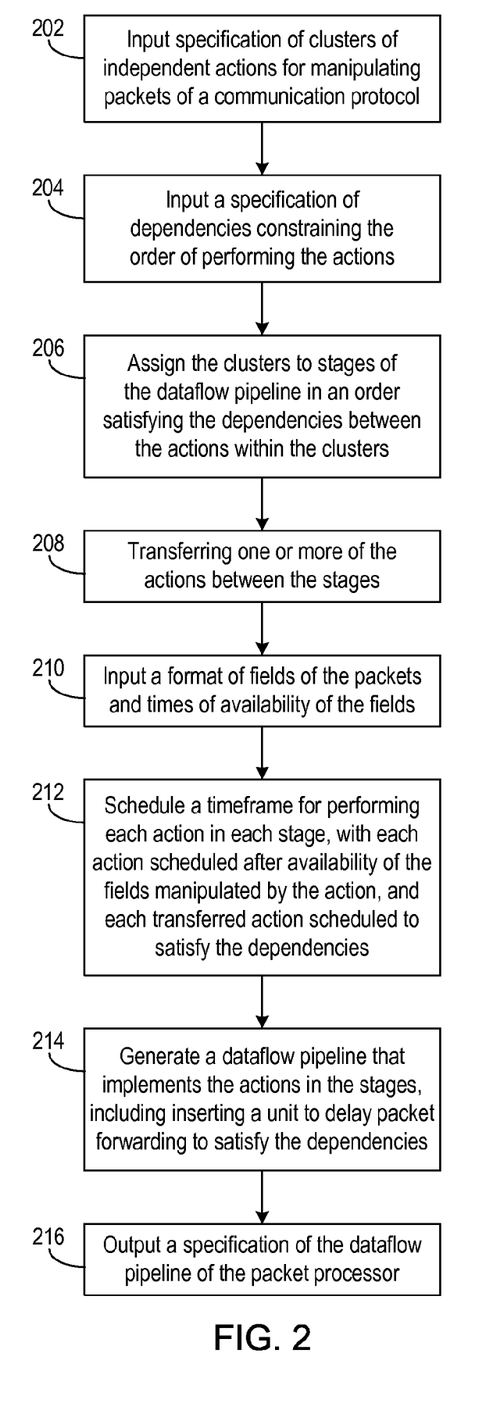
FIG. 2 is a flow diagram of a process for specifying a dataflow pipeline in accordance with various embodiments of the invention.

FIG. 2 is a flow diagram of a process for specifying a dataflow pipeline in accordance with various embodiments of the invention. The process creates the dataflow pipeline of a packet processor from actions for manipulating the packets and from dependencies between the actions.

At step 202, a specification of clusters is input, and the clusters partition the actions into independent groups of the actions, such that each action of a cluster is not dependent on all of the other actions of in the cluster. At step 204, a specification of dependencies is input, and the dependencies constrain the performance of the actions. In one example, a data dependency constrains the performance of an action requiring a data value to occur after the performance of an action defining the data value. In another example, a resource dependency specifies a number of a particular type of actions that can be performed concurrently. In yet another example, the dependencies include multiple data and resource dependencies.

At step 206, the clusters are assigned to stages of a dataflow pipeline of the packet processor. The cluster of actions are assigned to stages to satisfy the dependencies between the actions. In one embodiment, actions not dependent on another action are identified, and then a search is performed from action to action through the dependencies, beginning from the actions not dependent on another action. The cluster of each action visited during this search is added to an ordering of the clusters unless the cluster is already included in the ordering. If the search finds a cycle of dependencies, the clusters cannot be scheduled in a dataflow pipeline that satisfies the dependencies. If the search does not find a cycle of dependencies, the order of visiting the clusters becomes the order of the stages in the dataflow pipeline, with each stage including the actions of the corresponding cluster.

Each packet processed by the dataflow pipeline flows through the stages in the order of the stages. A stage manipulates an incoming packet received from a preceding stage to produce an outgoing packet sent to a following stage, and the stage manipulates the incoming packet according to the actions of the stage to produce the outgoing packet. In one example, a particular stage receives incoming packets of a specific type without producing a corresponding outgoing packet, and creates certain outgoing packets without receiving a corresponding incoming packet.

At step 208, one or more of the actions are transferred between stages. In one embodiment, tiny clusters with a very small number of actions are eliminated by transferring all of the actions to other clusters, and the remaining clusters are balanced to contain a similar number of actions by transferring actions from the larger clusters to the smaller clusters. While the actions assigned to each stage are initially independent, an action transferred into a stage might have a dependency with another action in the stage. It will be appreciated that actions are transferred between clusters before the clusters are assigned to the stages of the dataflow pipeline in another embodiment.

At step 210, a format for the fields of the packets and availability times for the fields are input. In one embodiment, the format is a listing of the fields in the order that the packet processor receives the fields for each type of packet, and for each field the listing includes a width of the field in data bits. The availability time for each field is given by the total width of the prior fields in the listing and a width of a data bus for receiving the packets.

At step 212, the timeframe is scheduled for performing the actions in each stage. Because the ordering of the stages satisfies all of the dependencies between actions in different stages, each stage is scheduled independently. Each action of a stage is scheduled after each field manipulated by the action becomes available. When the actions transferred at step 208 causes a dependency between two actions within a stage, the two actions are scheduled to satisfy the dependency. In one embodiment, the timeframe scheduled for an action includes a start time for beginning performance of the action and an end time for completing the performance of the action.

At step 214, the dataflow pipeline of the packet processor is generated to implement the actions of the clusters assigned to each stage of the dataflow pipeline. In one example, the dataflow pipeline is generated with a delay unit between two stages to help satisfy the dependencies between the two stages. In one example, the first stage in the dataflow pipeline has an action reading data from a field at the end of an incoming packet, and the second stage has an action writing this data to a field at the beginning of the incoming packet. The delay unit delays the forwarding of the packet from the first stage to the second stage to give enough time for the first stage to provide the data to the second stage.

At step 216, a specification is output that specifies the stages of the dataflow pipeline, including the scheduled timeframes for the actions of each stage.

Figure 3:
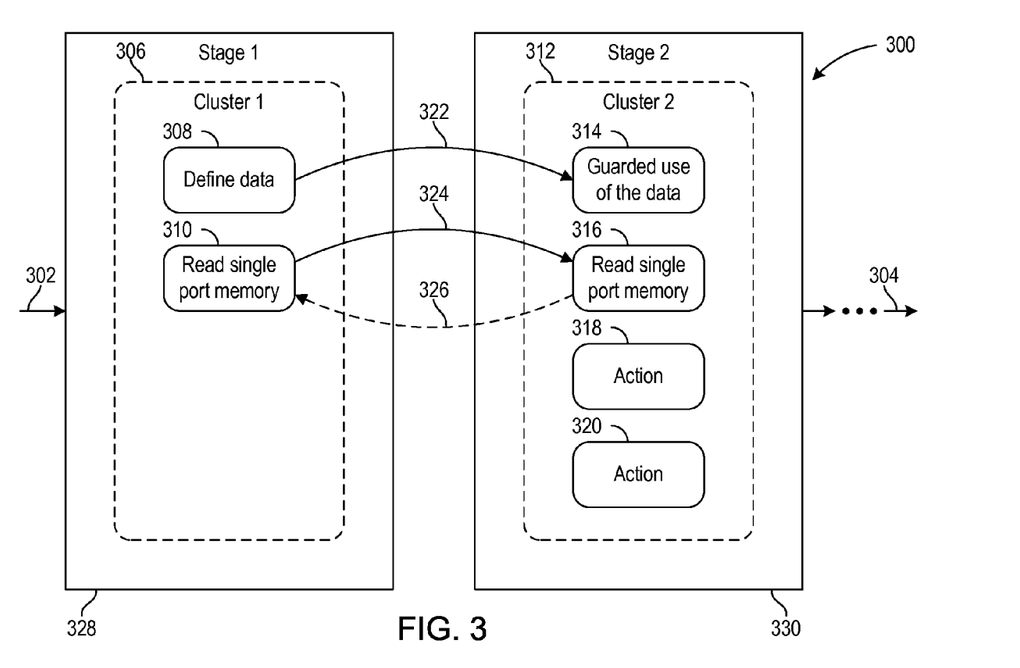
FIG. 3 is a block diagram of a dataflow pipeline in accordance with various embodiments of the invention.

FIG. 3 is a block diagram of a dataflow pipeline 300 in accordance with various embodiments of the invention. The dataflow pipeline 300 receives incoming packets on line 302 and outputs outgoing packets on line 304, and the dataflow pipeline 300 manipulates the incoming packets received on line 302 according to specified actions to produce the outgoing packets on line 304.

Cluster 306 includes action 308 defining data and action 310 accessing a resource. Cluster 312 includes actions 314, 316, 318, and 320. Action 314 requires data defined by action 308, and dependency 322 indicates that action 314 should be performed after action 308 is performed. Action 316 accesses the same resource as action 310. Dependencies 324 and 326 indicate that the resource supports concurrent performance of one action at a time. It will be appreciated that a resource can support concurrent performance of multiple actions, such as a dual port memory permitting two concurrent memory accesses.

In one example, action 308 is a variable set action that sets the value of a local variable from one or more fields of an incoming packet. Action 314 is an action enabled and disabled by a guard condition based on the value of the local variable set by action 308. Because the value of the local variable is required to determine whether or not action 314 is actually performed for each packet, data dependency 322 constrains the performance of action 314 to follow the performance of action 308. In addition, the performance of action 314 is scheduled following the availability of any field accessed by action 314.

In this example, action 310 is a read from a location in a single port memory and action 316 is a read from another location in the same single port memory. Because the single port memory is a resource that supports one read access at a time, dependencies 324 and 326 constrain the performance of actions 310 and 316. The resource dependency represented by dependencies 324 and 326 is satisfied when either dependency 324 is satisfied or dependency 326 is satisfied. Thus, dependencies 324 and 326 are alternative dependencies.

The clusters 306 and 312 are ordered by a search through the dependencies 322, 324, and 326. For example, the resource dependency between actions 310 and 316 is initially represented by including dependency 326 and omitting alternative dependency 324. A search through the dependencies 322 and 326 finds a cycle through the dependencies 322 and 326. Because the dependencies 322 and 326 form a cycle through action 310 of cluster 306 and action 316 of cluster 312, the clusters 306 and 312 are not schedulable because the dependencies 322 and 326 form a cycle through clusters 306 and 312.

After determining that the dependencies are not schedulable when the resource dependency is represented by including dependency 326 and omitting dependency 324, the resource dependency between actions 310 and 316 is subsequently represented by omitting dependency 326 and including dependency 324. Because search through the dependencies 322 and 324 does not find a cycle, the clusters 306 and 312 are schedulable in an order that satisfies the dependencies. The search begins from the actions 308 and 310 of the cluster 306, which does not include any of the actions 314 and 316 having performance constrained to follow the performance of actions 308 and 310 by the dependencies 322 and 324, respectively. The order of scheduling the clusters 306 and 312 is given by the order of visiting first cluster 306 and then visiting cluster 312 during the search through the dependencies 322 and 324. In addition, cluster 312 is scheduled after cluster 306 because cluster 312 includes actions 314 and 316 that respectively should be performed after actions 308 and 310 of cluster 306.

Because cluster 306 is first and cluster 312 is second in the ordering, cluster 306 of actions 308 and 310 is assigned to the first stage 328 of the dataflow pipeline 300, and cluster 312 of actions 314, 316, 318, and 320 is assigned to the second stage 330 of the dataflow pipeline 300. Thus, the actions 308 and 310 become actions of stage 328, and the actions 314, 316, 318, and 320 become actions of stage 330. In addition, the ordering of the clusters 306 and 312 becomes the ordering of the stages 328 and 330 in the dataflow pipeline 300. It will be appreciated that the dependencies are satisfied by concurrently performing all of the actions of each stage 306 and 312 in turn in the order of the clusters.

In one example, action 314 is a field set action for setting a value of a field of the packets, action 308 is a variable set action for setting a value of a local variable from one or more fields of the packets, actions 310 and 316 are memory read or write actions for accessing data in a memory, action 318 is an insert action for inserting data following a field of the packets, and action 320 is a delete action for deleting a field from the packets.

Figure 4:
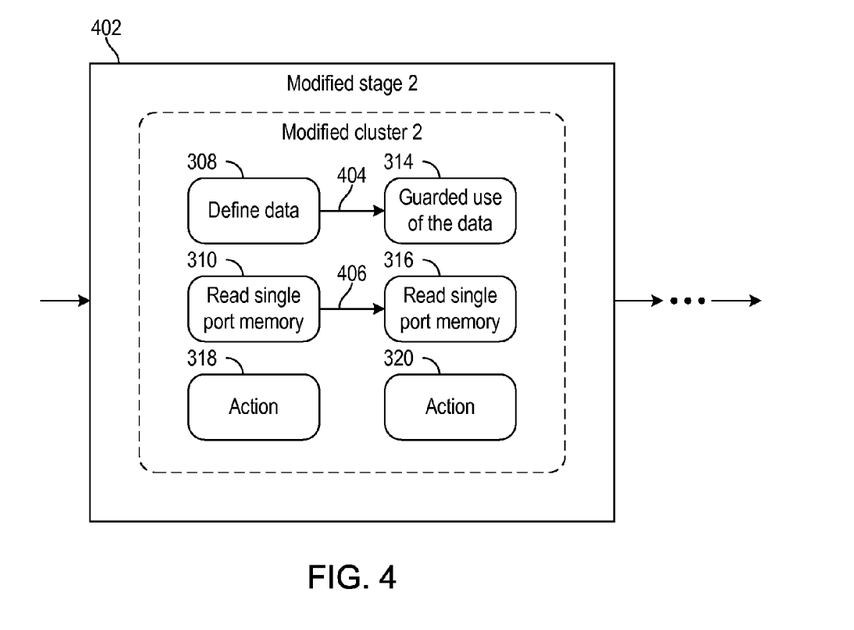
FIG. 4 is a block diagram of the dataflow pipeline of FIG. 3 with a stage eliminated in accordance with one or more embodiments of the invention.

FIG. 4 is a block diagram of the dataflow pipeline of FIG. 3 with a stage eliminated in accordance with one or more embodiments of the invention. Stage 328 of FIG. 3 is eliminated by transferring all of the actions 308 and 310 from stage 328 to the other stage 330 to produce the modified stage 402 of FIG. 4. The modified stage 402 of FIG. 4 includes actions 308, 310, 314, 316, 318, and 320 from stages 328 and 330 of FIG. 3.

The structural dependency 322 between action 308 of stage 328 and action 314 of stage 330 becomes a temporal dependency 404 between actions 308 and 314 within the modified stage 402. Similarly, the structural dependency 324 between action 310 of stage 328 and action 316 of stage 330 becomes a temporal dependency 406 between actions 310 and 316 within the modified stage 402.

It will be appreciated that stage 402 of FIG. 4 could result from eliminating stage 330 from FIG. 3 by transferring actions 314, 316, 318, and 320 from stage 330 to stage 328, and then stage 402 of FIG. 4 would correspond to a modification of stage 328 of FIG. 3.

Figure 5:
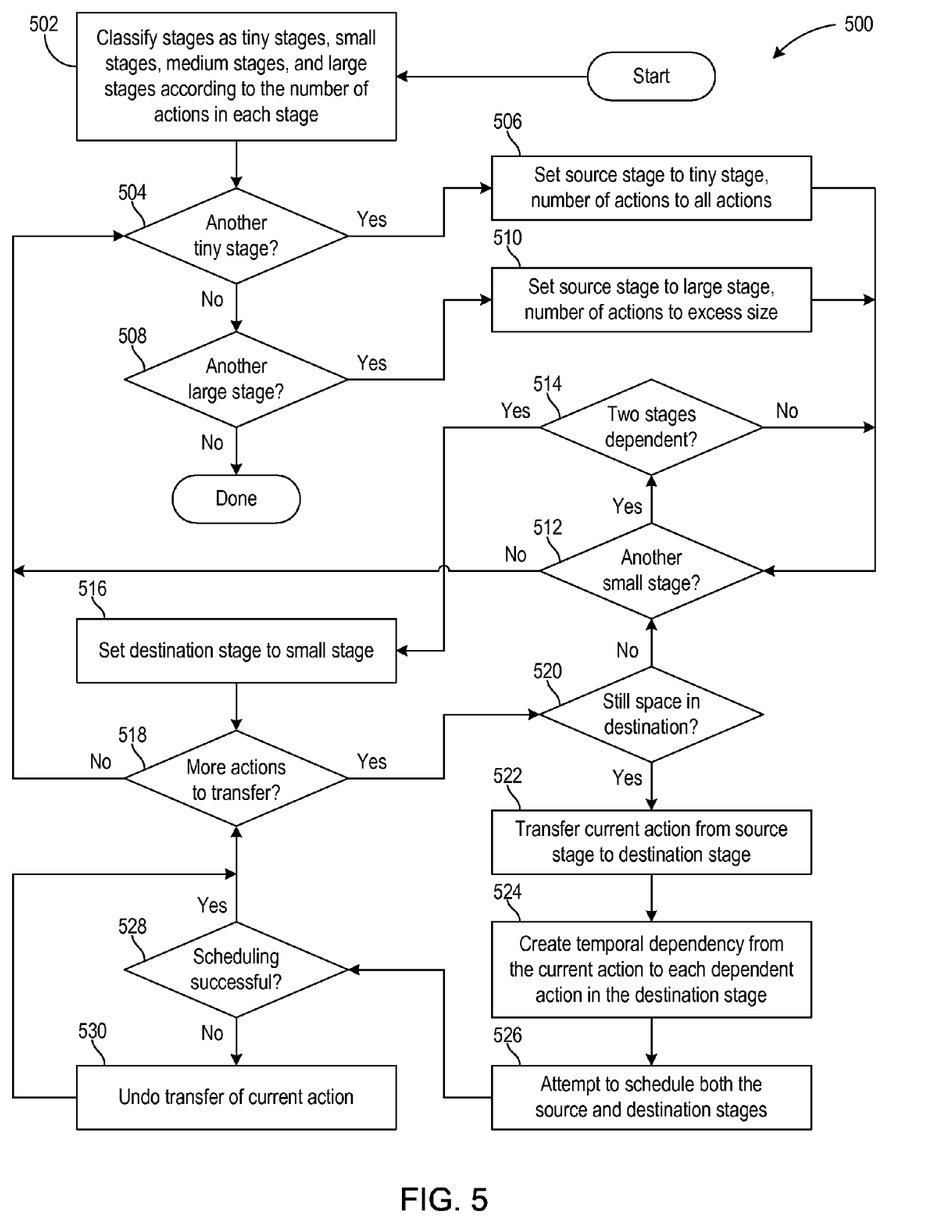
FIG. 5 is a flow diagram of a process for balancing a dataflow pipeline in accordance with one or more embodiments of the invention.

FIG. 5 is a flow diagram of a process 500 for balancing a dataflow pipeline in accordance with one or more embodiments of the invention. In one embodiment, the smallest stages are eliminated and the remaining stages are balanced to each include a similar number of the actions by transferring actions from stages having a higher number of actions to stages having a lower number of actions. Elimination of a stage simplifies the dataflow pipeline and eliminates certain circuitry overhead for operating the stage. Balancing the number of actions in the remaining stages often increases throughput and reduces the latency of the dataflow pipeline.

At step 502, the stages are classified, with tiny stages including a very small number of actions, small stages including a small number of actions, medium stages including an average number of actions, and large stages including a large number of actions.

Process 500 first determines the source stage from which to transfer actions. Decision 504 checks whether there is another tiny stage to process. If there is another tiny stage, process 500 proceeds to step 506 to set the source stage to the tiny stage in an attempt to eliminate the tiny stage. Otherwise, process 500 proceeds to decision 508. Decision 508 checks whether there is another large stage to process. If there is another large stage, process 500 proceeds to step 510 to set the source stage to the large stage in an attempt to reduce the size of the large stage.

Next, process 500 determines the destination stage to which to transfer actions. Decision 512 checks whether there is another small stage to consider for the destination stage. If there is another small stage, process 500 proceeds to decision 514; otherwise, process 500 returns to decision 504 to select another pairing of source and destination stages. Note that process 500 does not modify the medium stages.

Decision 514 checks whether the source and destination stages have a dependency between the actions in the source stage and the actions in the destination stage. If there is such a dependency, process 500 proceeds to step 516; otherwise, process 500 returns to decision 512.

Decision 518 checks whether there are more actions to transfer from the source stage. All actions in a tiny source stage are considered for transfer to eliminate the tiny source stage. Actions in a large source stage are considered for transfer until the size of the stage is reduced to a target size. If there are more actions to transfer for the current pairing of source and destination stages, process 500 proceeds to decision 520; otherwise, process 500 returns to decision 504 to select another pairing of source and destination stages.

Decision 520 checks whether the destination stage has space for additional actions. The size of each small destination stage increases as actions are transferred, and once the size increases to the size of a medium stage, no more actions are added to the destination stage. If the destination stage has remaining space, process 5000 proceeds to step 522; otherwise, process 500 returns to decision 512 to select another small stage for the destination stage.

At step 522, the current action is transferred from the source stage to the destination stage. At step 524, a temporal dependency is created between the transferred action and each dependent action in the destination stage. At step 526, process 500 attempts to schedule the performance of the actions in both the source and destination stage. Decision 528 checks whether the scheduling was successful. For successful scheduling, process 500 returns to decision 518 to select the next action to transfer between the source and destination stages. If the scheduling of the source and destination stages is unsuccessful from a cycle of dependencies in the destination stage for example, process 500 proceeds to step 530 to undo the transfer of steps 522 and 524.

Figure 6:
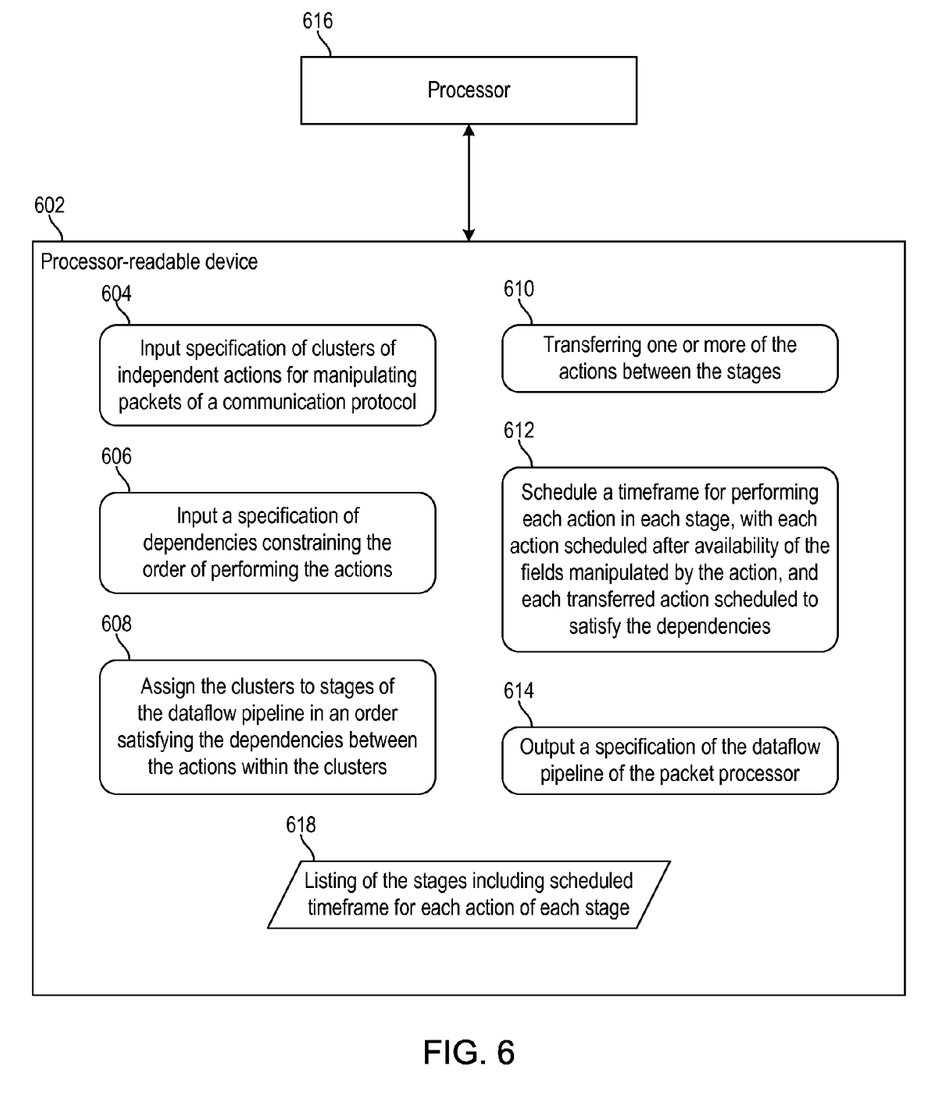
FIG. 6 is a block diagram of a computing system for implementing a dataflow pipeline in accordance with various embodiments of the invention.

FIG. 6 is a block diagram of a computing system for implementing a dataflow pipeline in accordance with various embodiments of the invention. Processor-readable device 602 is configured with software modules 604, 606, 608, 610, 612, and 614 for specifying a packet processor implementing actions for manipulating packets of a communication protocol.

Execution of the instructions in software module 604 causes processor 616 to input a specification of clusters of the actions. Each action of each cluster is not dependent on all other of the actions in the cluster.

Execution of the instructions in software module 606 causes processor 616 to input a specification of one or more dependencies constraining performance of the actions.

Execution of the instructions in software module 608 causes processor 616 to assign each cluster of actions to a respective stage of a dataflow pipeline of the packet processor. The dependencies are satisfied by performing the actions of each stage in the order of the stages in the dataflow pipeline.

Execution of the instructions in software module 610 causes processor 616 to transfer one or more actions between the stages.

Execution of the instructions in software module 612 causes processor 616 to schedule a timeframe for performing each action in each stage of the dataflow pipeline. The actions in each stage are scheduled in accordance with the dependencies, especially for each stage receiving a transferred action.

Execution of the instructions in software module 614 causes processor 616 to output a specification of the dataflow pipeline. In one embodiment, a listing 618 is created in processor-readable device 602, and the listing includes the stages of the dataflow pipeline and the scheduled timeframe for performing the actions in each stage.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

The present invention is thought to be applicable to a variety of systems for specifying a packet processor for manipulating packets of a communication protocol. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method of specifying a processor implementing a plurality of actions for manipulating a plurality of packets of a communication protocol, comprising:
  inputting a cluster-specification of a plurality of clusters of the actions for manipulating a plurality of fields of the packets of the communication protocol, wherein each action of each cluster is not dependent on all other of the actions in the cluster;
  inputting a constraint-specification of at least one dependency constraining a performance of the actions, including a dependency between a first one of the actions from a first one of the clusters and a second one of the actions from a second one of the clusters;
  for each cluster, assigning the cluster of the actions to a respective one of a plurality of stages of a dataflow pipeline of the processor, wherein the at least one dependency is satisfied by performing the actions of each stage in an order of the stages in the dataflow pipeline;
  transferring the first action from the respective stage of the first cluster to the respective stage of the second cluster;
  for each stage, scheduling a timeframe for the performance of each action in the stage of the dataflow pipeline, including scheduling the timeframe for the performance of the first and second actions in the respective stage of the second cluster in accordance with the dependency; and
  outputting a processor-specification of the dataflow pipeline.

2. The processor-implemented method of claim 1, wherein the plurality of actions include one of a field-set action for setting a value of one the fields of the packets, a variable-set action for setting a value of a local variable from at least one of the fields of the packets, a memory action for accessing data in a memory, an insert action for inserting data following one of the fields of the packets, or a delete action for deleting one of the fields from the packets.

3. The processor-implemented method of claim 1, wherein the inputting of the cluster-specification includes inputting a declarative description of the processor of the packets, and generating the clusters from the declarative description by merging independent ones of a plurality of respective initial clusters for the actions.

4. The processor-implemented method of claim 1, wherein the inputting the constraint-specification includes inputting each of a plurality of data dependencies between a respective first one of the actions defining a data value and at least a respective second one of the actions requiring the data value.

5. The processor-implemented method of claim 1, wherein the inputting the constraint-specification includes inputting a plurality of resource dependencies each specifying a number of the actions of a particular type that can be performed concurrently.

6. The processor-implemented method of claim 1, wherein the at least one dependency is satisfied by concurrently performing all of the actions of each stage in turn in the order of the stages in the dataflow pipeline.

7. The processor-implemented method of claim 1, wherein the assigning the clusters of the actions to the stages of the dataflow pipeline includes determining the clusters are schedulable because the at least one dependency does not form a cycle through the clusters.

8. The processor-implemented method of claim 1, wherein the assigning the clusters of the actions to the stages of the dataflow pipeline includes generating the order of the stages in the dataflow pipeline as the order of visiting the clusters in a search through the at least one dependency beginning from the clusters that do not include an action having the performance constrained to follow the performance of another action by the at least one dependency.

9. The processor-implemented method of claim 1, wherein the transferring includes transferring all of the actions from the respective stage of the first cluster to the stages other than the respective stage of the first cluster.

10. The processor-implemented method of claim 1, wherein the transferring includes balancing the stages by transferring the actions from the stages including a higher number of the actions to the stages including a lower number of the actions.

11. The processor-implemented method of claim 1, wherein the scheduling of the timeframe for the performance of each action in each stage further includes scheduling the timeframe for performing the actions within the stage independently from the scheduling of the timeframe for the performance of the actions in other ones of the stages.

12. The processor-implemented method of claim 1, wherein the scheduling of the timeframe for the performance of each action in each stage further includes scheduling the timeframe including a start time for beginning the performance of the action and an end time for completing the performance of the action.

13. The processor-implemented method of claim 1, further comprising:
inputting a format-specification of the fields of the packets and a plurality of respective times of availability of the fields,
wherein the scheduling of the timeframe for the performance of each action in each stage of the dataflow pipeline includes scheduling the timeframe for the performance each action of each stage after the respective times of the availability of the fields manipulated by the action.

14. The processor-implemented method of claim 13, wherein the scheduling of the timeframe for the performance of each action in each stage further includes scheduling one of the actions of the stage after the respective times of the availability of the fields read by a guard condition for enabling and disabling the one of the actions.

15. The processor-implemented method of claim 1, wherein:
the inputting of the constraint-specification includes inputting the constraint-specification including the dependency constraining the performance of the second action to follow the performance of the first action;
the assigning of each cluster to the respective stage of the dataflow pipeline includes assigning the respective stage of the second cluster to follow the respective stage of the first cluster in the order of the stages of the dataflow pipeline; and
the scheduling the timeframe for the performance of each action in each stage includes scheduling the timeframe for the performance of the second action following the timeframe for the performance of the first action.

16. The processor-implemented method of claim 1, wherein:
the inputting of the constraint-specification includes inputting the constraint-specification including the dependency constraining the performance of the first action to follow the performance of the second action;
the assigning of each cluster to the respective stage of the dataflow pipeline includes assigning the respective stage of the first cluster to follow the respective stage of the second cluster in the order of the stages of the dataflow pipeline; and
the scheduling the timeframe for the performance of each action in each stage includes scheduling the timeframe for the performance of the first action following the timeframe for the performance of the second action.

17. The processor-implemented method of claim 1, wherein the outputting the processor-specification of the dataflow pipeline comprises creating in a memory of a computing system a listing of the stages including the timeframe scheduled for the performance of the actions in each of the stages.

18. The processor-implemented method of claim 1, further comprising generating the dataflow pipeline implementing the actions in the stages of the dataflow pipeline of the processor, including generating the dataflow pipeline having a first stage and a last stage in the order of the stages of the dataflow pipeline, the first stage inputting the packets of the communication protocol and the last stage outputting the packets manipulated according to the actions.

19. The processor-implemented method of claim 1, further comprising generating the dataflow pipeline implementing the actions in the stages of the dataflow pipeline of the processor, including inserting a delay unit for delaying a forwarding of the packets between two adjacent stages in the order of the stages of the dataflow pipeline, the delay unit delaying the forwarding by an amount sufficient to satisfy the at least one dependency between the actions of the two adjacent stages.

20. A non-transitory program storage medium, comprising:
a processor-readable storage device configured with instructions for specifying a processor implementing a plurality of actions for manipulating a plurality of packets of a communication protocol, wherein execution of the instructions by one or more processors causes the one or more processors to perform operations including:

inputting a cluster-specification of a plurality of clusters of the actions for manipulating a plurality of fields of the packets of the communication protocol, wherein each action of each cluster is not dependent on all other of the actions in the cluster;

inputting a constraint-specification of at least one dependency constraining a performance of the actions, including a dependency between a first one of the actions from a first one of the clusters and a second one of the actions from a second one of the clusters;

for each cluster, assigning the cluster of the actions to a respective one of a plurality of stages of a dataflow pipeline of the processor, wherein the at least one dependency is satisfied by performing the actions of each stage in an order of the stages in the dataflow pipeline;

transferring the first action from the respective stage of the first cluster to the respective stage of the second cluster;

for each stage, scheduling a timeframe for the performance of each action in the stage of the dataflow pipeline, including scheduling the timeframe for the performance of the first and second actions in the respective stage of the second cluster in accordance with the dependency; and outputting a processor-specification of the dataflow pipeline.

\* \* \* \* \*